United States Patent [19]

Karpinski, Jr.

[11] Patent Number: 5,283,627

[45] Date of Patent: Feb. 1, 1994

[54] SYSTEM FOR INHIBITING QUENCHING OF LASER BEAMS IN RESPONSE TO RADIATION EVENTS

[75] Inventor: Andrew J. Karpinski, Jr., Clearwater, Fla.

[73] Assignee: Honeywell Inc., Minneapolis, Minn.

[21] Appl. No.: 74,232

[22] Filed: Jun. 9, 1993

Related U.S. Application Data

[63] Continuation of Ser. No. 697,815, May 9, 1991, abandoned.

[51] Int. Cl.$^5$ ............................................. G01C 19/66
[52] U.S. Cl. ...................................... 356/350; 372/94
[58] Field of Search ................ 356/350, 351; 250/374, 250/390.1, 394

[56] References Cited

U.S. PATENT DOCUMENTS 4,652,132  4/1987  Nelson ................................ 356/350

Primary Examiner—Samuel A. Turner
Assistant Examiner—LaCharles P. Keesee, II
Attorney, Agent, or Firm—Robert A. Pajak

[57] ABSTRACT

The present invention inhibits quenching of a laser following a radiation event by providing a radiation sensing arrangement connected to the discharge current control circuitry controlling the discharge current of the laser, for sensing a radiation event and for controlling the discharge current control circuitry in such a way that quenching of the laser for a predetermined amount of time after a radiation event is inhibited.

20 Claims, 2 Drawing Sheets

SYSTEM FOR INHIBITING QUENCHING OF LASER BEAMS IN RESPONSE TO RADIATION EVENTS

This application is a continuation, of application Ser. No. 07/697,815, filed May 9, 1991 now abandoned.

BACKGROUND OF THE INVENTION

The present invention relates to the control of the discharge current along the laser paths of a ring laser gyro and, more particularly, to a system for inhibiting the quenching of the laser beams in a ring laser gyro after a radiation event.

Ring laser gyros are used, for example, in inertial navigation systems and typically comprise a quartz block having a closed loop lasing path formed therein. The lasing path is filled with a suitable gas and then the quartz block is sealed. At least a cathode and two anodes are provided on the block having electrodes in communication with the gas in order to supply a discharge current in the lasing path to excite the electrons of the gas atoms. As a result, the electrons are excited to different energy levels thereby emitting photons to produce the lasing effect. Typically, two counterpropagating laser beams are produced around the close loop path. The two laser beams interfere with one another such that an interferometer senses the interference pattern resulting from the interaction between the two laser beams As the ring laser gyro experiences rotation, the interference pattern shifts Sensors are provided to sense the shift in the interference pattern so that the inertial guidance system can detect movement of the structure supporting the ring laser gyro.

Discharge current controllers are usually provided in order to regulate the discharge current between the cathode and the anodes. When the ring laser gyro is subjected to an extremely large transient nuclear radiation event, the ionization of the gas within the ring laser gyro can increase dramatically. This increase in gas ionization results in a significant decrease in the voltage drop between the cathode and anodes resulting in a substantial increase in discharge current. The discharge current control circuitry usually recovers from the radiation event before the extra discharge path ionization dissipates. The discharge current control circuitry will, therefore, reduce the higher discharge current flow before the extra gas ionization dissipates. When the radiation-induced ionization finally does dissipate, the current control circuitry frequently is unable to track the resulting rapid increase in voltage across the ring laser gyro electrodes. Thus, subsequent to the event, the extra radiation-induced ionization collapses causing a rapid increase in the voltage and a rapid decrease in discharge current. The discharge current control circuitry cannot respond quickly enough in order to keep the discharge current at a level which will support lasing. Consequently, as the extra radiation-induced ionization collapses, there will be insufficient current flow along the laser paths of the ring laser gyro to support lasing and, as a result, the laser beams will be quenched.

SUMMARY OF THE INVENTION

The present invention inhibits this quenching of a laser beam following a radiation event by providing a radiation sensing arrangement connected to the discharge current control circuitry of a laser for sensing a radiation event and for controlling the discharge current control circuitry in such a way that quenching of the laser beam for a predetermined amount of time after a radiation event is inhibited.

BRIEF DESCRIPTION OF THE DRAWINGS

These and other features and advantages will become apparent from a detailed consideration of the invention when taken in conjunction with the drawings in which.

DETAILED DESCRIPTION

Figure 1:
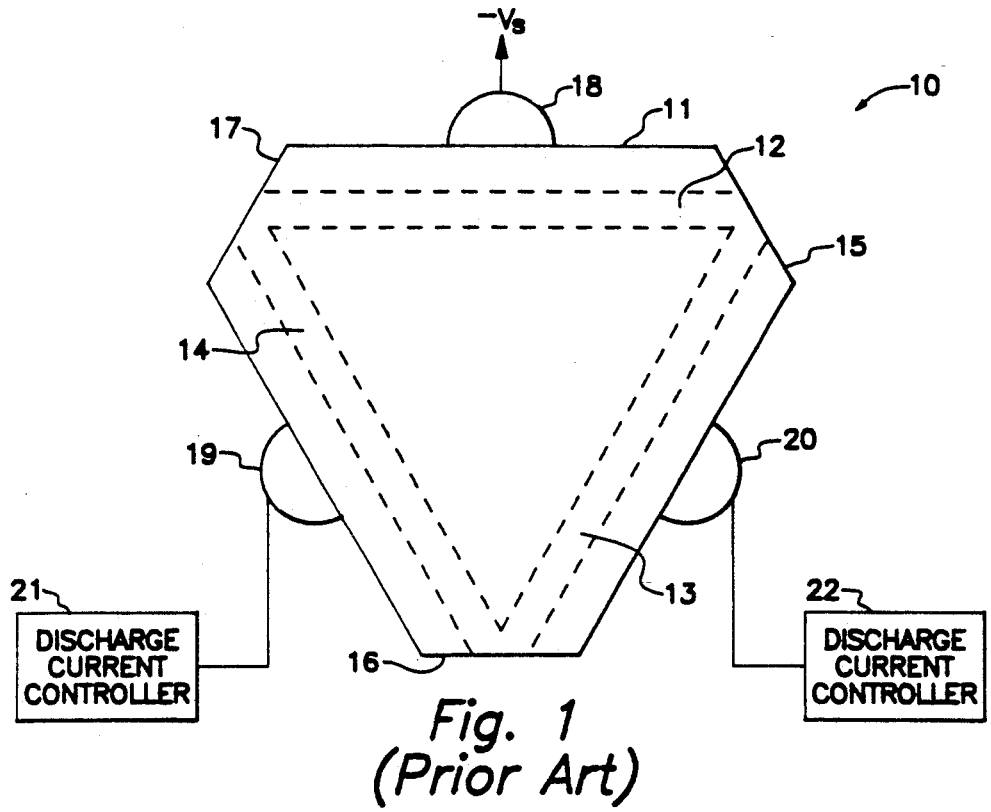
FIG. 1 illustrates a prior art ring laser gyro with discharge current controllers.

As shown in FIG. 1, ring laser gyro 10 comprises block 11 in the shape of a polygon, in this case a triangle. Block 11 may be made of a quartz material having laser paths 12, 13, and 14 formed therein. Laser paths 12, 13, and 14 contain a suitable gas which, when the atoms thereof are excited by a discharge current, produce photons establishing laser beams along paths 12, 13, and 14. Mirrors can be provided at apexes 15, 16, and 17 for directing the laser beams along paths 12, 13, and 14.

Block 11 also carries cathode 18 and anodes 19 and 20 in communication with the gas in laser paths 12, 13, and 14. Cathode 18 is connected to a ring laser gyro supply voltage $V_S$ whereas anodes 19 and 20 are connected to corresponding discharge current controllers 21 and 22. Discharge current controllers 21 and 22 will control the voltage drop between cathode 18 and corresponding anodes 19 and 20 and, therefore, the resulting discharge current flowing between cathode 18 and anodes 19 and 20.

As previously mentioned, discharge current controllers 21 and 22 currently cannot respond fast enough following the collapse of the radiation-induced ionization of the gas within laser paths 12, 13, and 14 in order to reestablish the necessary discharge current level in order to maintain lasing of the gas. Consequently, the laser beams travelling along laser paths 12, 13, and 14 will extinguish.

Figure 2:
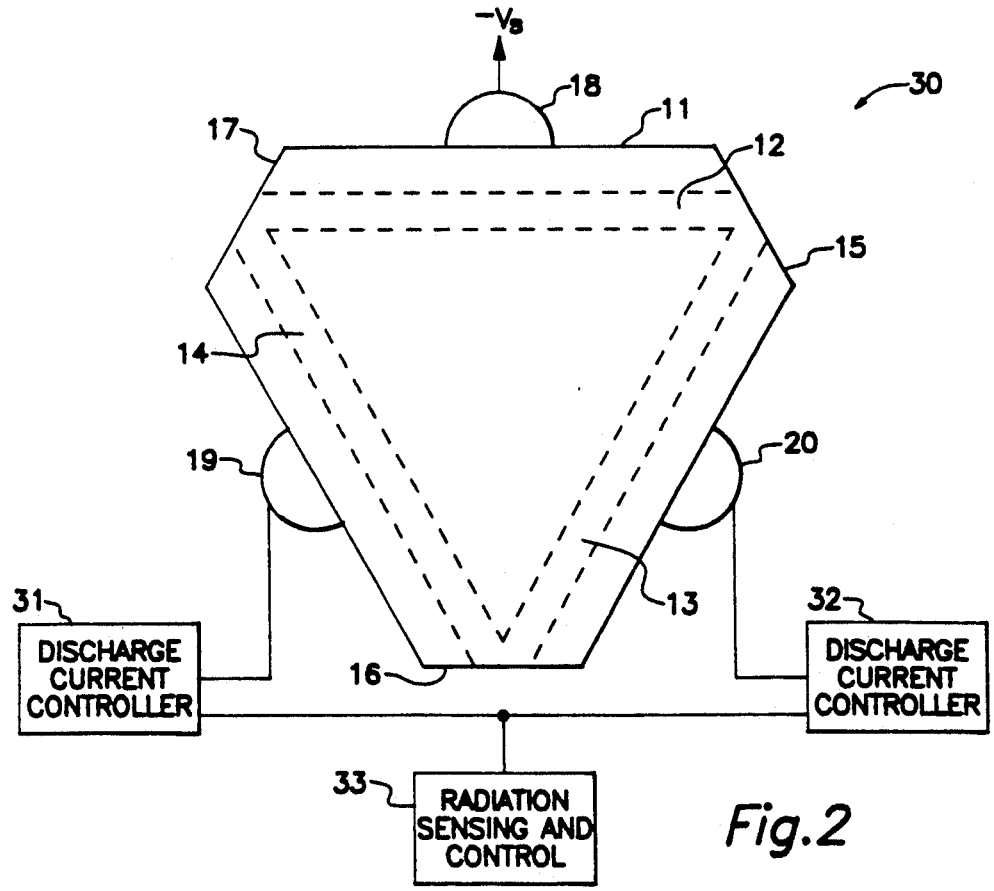
FIG. 2 illustrates the present invention.

FIG. 2 shows a control arrangement according to the present invention for inhibiting quenching of the laser beams supported along laser paths 12, 13, and 14. As shown in FIG. 2, ring laser gyro 30 can include many of the same elements as shown in FIG. 1 and, therefore, the same reference numerals are used to depict the common elements of FIGS. 1 and 2. Discharge current controllers 31 and 32 shown in FIG. 2 can be the same as discharge current controllers 21 and 22, but they need not necessarily be the same and are, therefore, depicted with different reference numerals. While radiation sensing and control 33 is shown connected to both discharge current controllers 31 and 32, it should be understood that separate radiation sensing and controls 33 can be provided for each discharge current controller 31 and 32. Radiation sensing and control 33 will inhibit the quenching of the laser beams of ring laser gyro 30 following a radiation event.

Figure 3:
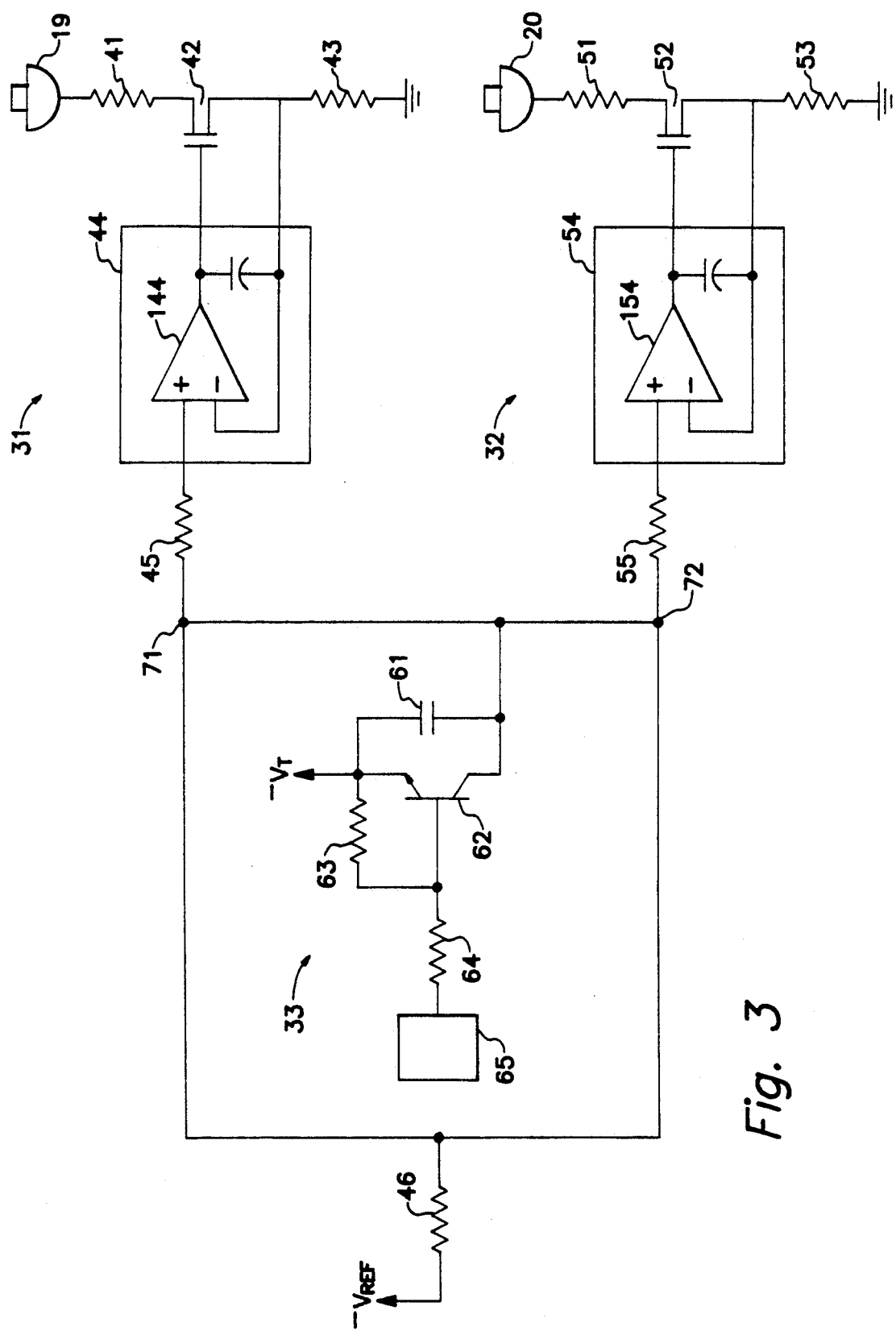
FIG. 3 is a schematic diagram of the discharge current controllers and the radiation sensing and control apparatus shown in FIG. 2.

The discharge current controllers 31 and 32, and the radiation sensing and control 33, are shown in more detail in FIG. 3. Discharge current controller 31 includes resistor 41 connected between anode 19 and the source/drain circuit of current control element 42 in the form of a Field Effect Transistor (FET). Resistor 43 is connected between the source/drain circuit of current control element 42 and a reference such as ground. The control element or gate of current control element 42 is connected to the output of integrator 44 having one of its inputs connected to the junction of the source/drain circuit of current control element 42 and resistor 43 and its other input connected to one end of resistor 45.

Similarly, discharge current controller 32 includes resistor 51 connected between anode 20 and the source/drain circuit of current control element 52 which may be in the form of a Field Effect Transistor. Resistor 53 is connected between the source/drain circuit of current control element 52 and a reference such as ground. The control element or gate of current control element 52 is connected to the output of integrator 54 having one of its inputs connected to the junction of the source/drain circuit of current control element 52 and resistor 53 and its other input connected to one side of resistor 55.

The other sides of resistors 45 and 55 are connected together and through resistor 46 to first reference $-V_{REF}$. During normal operation, integrators 44 and 54 compare the first reference supplied by $-V_{REF}$ to the discharge current signal in the form of the voltage across corresponding resistors 43 and 53 which voltages are dependent upon the level of discharge current from corresponding anodes 19 and 20. Any change in discharge current will cause the output from corresponding integrator 44 and/or 54 to ramp for adjusting corresponding control elements 42 and/or 52 in order to bring the discharge current from corresponding anodes 19 and/or 20 back to the level established by $-V_{REF}$.

Without radiation sensing and control 33, if ring laser gyro 30 is subjected to a transient nuclear radiation event, ionization of the gas in laser paths 12, 13, and 14 can increase dramatically. Accordingly, the voltage drop between cathode 11 and anodes 19 and 20 will drop significantly causing a significant increase in the discharge currents sensed by current-sensing resistors 43 and 53. After passage of the radiation event, discharge current controllers 31 and 32 respond more quickly to the passage of the radiation event than does the gas in laser paths 12, 13, and 14. As a result, discharge current controllers 31 and 32 will sense the elevated current levels in current-sensing resistors 43 and 53 before the radiation-induced ionization dissipates, thus causing integrators 44 and 54 to drive current control elements 42 and 52 in a direction to decrease discharge current conducting between cathode 18 and anodes 19 and 20. Shortly thereafter, the radiation-induced ionization will collapse at a rate much faster than can be detected by discharge current controllers 31 and 32. As the radiation-induced ionization collapses, the voltage across cathode 18 and anodes 19 and 20 dramatically increases resulting in a dramatic decrease in discharge current. This current decreases so rapidly that integrators 44 and 54 are not able to increase conductivity of current control elements 42 and 52 sufficiently fast to maintain the discharge current at a level to support lasing along laser paths 12, 13, and 14. Consequently, the laser beams propagating along these paths will be quenched.

Radiation sensing and control arrangement 33 inhibits this quenching. Radiation sensing and control arrangement 33 includes a second reference $-V_T$ connected through capacitor 61 to both the junction 71 of resistors 45 and 46 and the junction 72 of resistors 46 and 55. Connected across capacitor 61 is an NPN transistor 62 having its emitter connected to the junction of reference $-V_T$ and capacitor 61 and its collector connected to the other side of capacitor 61 and to junctions 71 and 72. The emitter and base of transistor 62 are interconnected by resistor 63 and the base of transistor 62 is connected by resistor 64 to radiation detector 65. Radiation detector 65 can be any device which produces an output signal in response to radiation. For example, such radiation detector 65 has been made under part number HSN3000 by IRT. However, any suitable device can be used for radiation detector 65. During a severe transient radiation event, radiation-triggered transistor 62 will close shorting out capacitor 61. Consequently, second reference $-V_T$ is connected to integrators 44 and 54 through resistors 45 and 55 to become the new reference for discharge current controllers 31 and 32. The value of $-V_T$ is chosen so that the discharge current controllers 31 and 32 drive current control elements 42 and 52 well into saturation (minimum resistance). With current control elements 42 and 52 operated in saturation, resistors 41, 43, 51, and 53 are the only elements to limit the ring laser gyro discharge current. Upon recovery of the electronics from the radiation event, transistor 62 opens allowing capacitor 61 to begin charging. The time constant of capacitor 61 and resistor 46 is chosen to be long enough that the current control elements 42 and 52 are still saturated when the radiation-induced ionization dissipates. This time delay guarantees a high enough current flowing through the ring laser gyro discharge current paths in order to maintain lasing in laser paths 12, 13, and 14. The voltage across capacitor 61 will eventually charge up to $-V_T - (-V_{REF})$ at which point $-V_{REF}$ will again be the reference for integrators 44 and 54. Thus, quenching of the laser beams propagating along laser paths 12, 13, and 14 is inhibited.

FIG. 3 shows operational amplifiers 144 and 154 having external feedback capacitors. However, most operational amplifiers currently in use are frequency limited in order to make them stable. This frequency limiting has a 20 db/decade roll off causing the operational amplifiers to behave as integrators. Accordingly, an operational amplifier can be used as an integrator without an external capacitor in wide band width loops.

Operational amplifiers 144 and 154 perform two functions, to compare their inputs as well as to integrate any difference between those inputs. Therefore, for purposes of the present invention, these amplifiers may be referred to as comparators or integrators and any use of one these terms is intended to cover either or both of these two functions and is not intended to be limiting.

What is claimed is:

1. A system for inhibiting quenching of a laser beam following a nuclear radiation event, said laser beam propagating along a laser path of a laser, said system comprising:

current control means connected to said laser for controlling discharge current conducting along said laser path; and radiation sensing means connected to said current control means including (i) nuclear radiation sensing means for sensing a nuclear radiation event and (ii) current control altering means for affecting said current control means for a predetermined amount of time following said nuclear radiation event and causing said discharge current to be maintained for said predetermined amount of time above a value, below which quenching of said laser beam will occur.

2. The system of claim 1 wherein said current control altering means comprises time delay means for connecting a reference to said current control means in response to said radiation event and for removing said reference from said current control means after a predetermined time delay following said radiation event.

3. The system of claim 2 wherein said time delay means comprises capacitive means and radiation responsive switch means being connected between said reference and said current control means such that said radiation responsive switch means connects said reference to said current control means during a radiation event and said capacitive means removes said reference from said current control means after a predetermined time delay following said radiation event.

4. The system of claim 1 wherein said current control means comprises current sensing means for providing a discharge current signal representative of said discharge current, reference means for providing a first reference, and comparison means connected to said current sensing means and to said reference means for comparing said discharge current signal to said first reference and for controlling said discharge current in response to said discharge current signal being compared to said first reference.

5. The system of claim 4 wherein said current control altering means comprises time delay means for connecting a second reference to said comparison means in response to said radiation event such that said comparison means compares said second reference, instead of said first reference, to said discharge current signal and for removing said second reference from said comparison means after a predetermined time delay following a radiation event to allow said first reference to increasingly assume control of said discharge current during said time delay.

6. The system of claim 5 wherein said time delay means comprises capacitive means and radiation responsive switch means being connected between said second reference and said comparison means such that said radiation responsive switch means connects said second reference to said comparison means during a radiation event and said capacitive means removes said second reference from said comparison means after a predetermined time delay following said radiation event.

7. The system of claim 4 wherein said comparison means comprises a comparator connected to said current sensing means and to said reference means for comparing said discharge current signal to said first reference and a current control element connected to said comparator, said current control element being connected in a series circuit with said current sensing means, said series circuit being connected to said laser for controlling said discharge current in response to said discharge current signal being compared to said first reference.

8. The system of claim 7 wherein said current control altering means comprises time delay means for connecting a second reference to said comparator in response to said radiation event such that said comparator compares said second reference, instead of said first reference, to said discharge current signal and for removing said second reference from said comparator after a predetermined time delay following a radiation event to allow said first reference to increasingly assume control of said discharge current during said time delay.

9. The system of claim 8 wherein said time delay means comprises capacitive means and radiation responsive switch means being connected between said second reference and said comparator such that said radiation responsive switch means connects said second reference to said comparator during a radiation event and said capacitive means removes said second reference from said comparator after a predetermined time delay following said radiation event.

10. A system for inhibiting quenching of a laser beam, established along a laser path in a ring laser gyro, following a nuclear radiation event, said ring laser gyro having at least first and second electrodes for receiving electrical power to provide a discharge current between said first and second electrodes along said laser path, said system comprising:

current control means connected to at least one of said electrodes of said ring laser gyro for controlling said discharge current conducting along said laser path between said first and second electrodes; and radiation sensing means connected to said current control means including,
 (i) nuclear radiation sensing means for sensing a nuclear radiation event, and
 (ii) current control altering means for affecting said current control means for a predetermined amount of time following said nuclear radiation event and causing said discharge current to be maintained for said predetermined amount of time above a value, below which quenching of said laser beam will occur.

11. The system of claim 10 wherein said current control altering means comprises time delay means for connecting a reference to said current control means in response to said radiation event and for removing said reference from said current control means after a predetermined time delay following said radiation event.

12. The system of claim 11 wherein said time delay means comprises capacitive means and radiation responsive switch means being connected between said reference and said current control means such that said radiation responsive switch means connects said reference to said current control means during a radiation event and said capacitive means removes said reference from said current control means after a predetermined time delay following said radiation event.

13. The system of claim 10 wherein said current control means comprises current sensing means for providing a discharge current signal representative of said discharge current, reference means for providing a first reference, and comparison means connected to said current sensing means and to said reference means for comparing said discharge current signal to said first reference and for controlling said discharge current in response to said discharge signal being compared to said first reference.

14. The system of claim 13 wherein said current control altering means comprises time delay means for connecting a second reference to said comparison means in response to said radiation event such that said comparison means compares said second reference, instead of said first reference, to said discharge current signal and for removing said second reference from said comparison means after a predetermined time delay following said radiation event to allow said first reference to increasingly assume control of said discharge current during said time delay.

15. The system of claim 14 wherein said time delay means comprises capacitive means and radiation responsive switch means being connected between said second reference and said comparison means such that said radiation responsive switch means connects said second reference to said comparison means during a radiation event and said capacitive means removes said second reference from said comparison means after a predetermined time delay following said radiation event.

16. The system of claim 13 wherein said comparison means comprises a comparator connected to said current sensing means and to said reference means for comparing said discharge current signal to said first reference and a current control element connected to said comparator, said current control element being connected in a series circuit with said current sensing means, said series circuit being connected to said at least one of said electrodes of said ring laser gyro for controlling said discharge current in response to said discharge current signal being compared to said first reference.

17. The system of claim 16 wherein said current control altering means comprises time delay means for connecting a second reference to said comparator in response to said radiation event such that said comparator compares said second reference, instead of said first reference, to said discharge current signal and for removing said second reference from said comparator after a predetermined time delay following a radiation event to allow said first reference to increasingly assume control of said discharge current during said time delay.

18. The system of claim 17 wherein said time delay means comprises capacitive means and radiation responsive switch means being connected between said second reference and said comparator such that said radiation responsive switch means connects said second reference to said comparator during a radiation event and said capacitive means removes said radiation second from said comparator after a predetermined time delay following said radiation event.

19. The system of claim 18 wherein said current-sensing means comprises resistor means having at least one resistor and said comparator comprises an integrator.

20. An arrangement for inhibiting quenching of a laser beam following a nuclear radiation event comprising:

laser means having a laser path for supporting a laser beam propagating therealong, said laser means further having first and second electrodes, said first and second electrodes, when energized, causing a discharge current to conduct along said laser path in order to produce said laser beam; and control means connected to at least one of said electrodes for controlling said discharge current conducting along said laser path, and said control means including,
(i) nuclear radiation sensing means for sensing a nuclear radiation event, and
(ii) means for causing said discharge current to be maintained for a predetermined amount of time following said radiation event above a value, below which quenching of said laser beam will occur.

* * * * *